United States Patent
Christiaans et al.

(10) Patent No.: US 10,312,724 B2
(45) Date of Patent: Jun. 4, 2019

(54) IMPLEMENTATION OF HIGH-VOLTAGE DIRECT-CHARGING 2:1 SWITCHED-CAPACITOR CONVERTER FOR BATTERY CHARGING OF ELECTRONIC DEVICES

(71) Applicant: NXP B.V., Eindhoven (NL)

(72) Inventors: Peter Christiaans, Mountain View, CA (US); Robert Glenn Crosby, II, Livermore, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/600,244

(22) Filed: May 19, 2017

(65) Prior Publication Data

US 2018/0337539 A1 Nov. 22, 2018

(51) Int. Cl.
| | | |
|---|---|---|
| H02J 7/00 | (2006.01) | |
| H02J 7/04 | (2006.01) | |
| H02M 3/07 | (2006.01) | |

(52) U.S. Cl.
CPC ............... *H02J 7/04* (2013.01); *H02M 3/07* (2013.01); *H02M 2003/072* (2013.01); *H02M 2003/077* (2013.01)

(58) Field of Classification Search
CPC ................................. H02J 7/0034; H02J 7/04
USPC .......................................................... 320/114
See application file for complete search history.

(56) References Cited

U.S. PATENT DOCUMENTS

| | | | |
|---|---|---|---|
| 9,065,329 B2 | 6/2015 | Kjaer et al. | |
| 2004/0263231 A1* | 12/2004 | Trafton ................. | H02M 3/073 327/327 |
| 2008/0158915 A1* | 7/2008 | Williams ................ | H02M 3/07 363/21.06 |
| 2009/0010035 A1* | 1/2009 | Williams .............. | H02M 3/158 363/131 |
| 2012/0043818 A1* | 2/2012 | Stratakos ................ | H02J 3/383 307/77 |
| 2015/0214848 A1 | 7/2015 | Umetani | |
| 2017/0264211 A1 | 9/2017 | Christiaans et al. | |
| 2018/0041060 A1* | 2/2018 | Walley .................. | H02J 7/0055 |
| 2018/0074564 A1* | 3/2018 | Paparrizos .............. | G06F 1/266 |
| 2018/0337545 A1* | 11/2018 | Crosby, II ............. | H02J 7/0068 |

FOREIGN PATENT DOCUMENTS

| | | |
|---|---|---|
| EP | 2903126 A1 | 8/2015 |
| WO | WO-2009/017783 A1 | 2/2009 |
| WO | WO-2012/151466 A2 | 11/2012 |

OTHER PUBLICATIONS

Reusch, D.C.; "High Frequency, High Power Density Integrated Point of Load and Bus Converters"; Dissertation, VPI&SU—DPhil EE; retrieved from the internet Apr. 19, 2017 https://these.lib.vt.edu/theses/available/etd-04162012-151740/unrestricted/Reusch_04_15.

Non Final Office Action; U.S. Appl. No. 15/668,514; 10 pages Apr. 19, 2019.

* cited by examiner

*Primary Examiner* — Suchin Parihar

(57) ABSTRACT

A power converter including a power conditioning circuit to receive input power and set operating voltages of the power converter, a current sensing circuit to determine an input current of the power converter, a voltage regulation circuit to step down a voltage level of the input power, a charge pump circuit to store charge delivered by the voltage regulation circuit and output to a load a current larger than the input current, and a power path controller to control switching and provide feedback within the power converter.

16 Claims, 2 Drawing Sheets

IMPLEMENTATION OF HIGH-VOLTAGE DIRECT-CHARGING 2:1 SWITCHED-CAPACITOR CONVERTER FOR BATTERY CHARGING OF ELECTRONIC DEVICES

TECHNICAL FIELD

Various embodiments disclosed herein relate to charging of mobile and other electronic devices, including implementation options for designing a high-efficiency 2:1 switched capacitor converter for high-voltage direct battery charging. Both 8-FET and 9-FET topology approaches are described, along with the applicable control circuitry.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include a power converter, including a power conditioning circuit to receive input power and set operating voltages of the power converter, a current sensing circuit to determine an input current of the power converter, a voltage regulation circuit to step down a voltage level of the input power, a charge pump circuit to store charge delivered by the voltage regulation circuit and output to a load a current larger than the input current, and a power path controller to control switching and provide feedback within the power converter.

The voltage regulation circuit may include a single transistor and driver circuit.

The voltage regulation circuit may include a pair of transistors that are switched at a fifty percent duty cycle.

The power converter may include a plurality of back gate transistors to block leakage current from output to input.

The charge pump circuit may include a pair of flying capacitors that are alternatively switched to provide power to a load.

The voltage regulation circuit may include a pair of input transistors and the charge pump circuit includes a pair of back gate transistors, a pair of mid-point transistors, and a pair of grounding transistors.

An input transistor and a mid-point transistor may be switched ON to charge the charge pump and are switched OFF to discharge the charge pump.

A back gate transistor and a grounding transistor may be switched ON to discharge the charge pump and are switched OFF to charge the charge pump.

The back gate transistors may be turned ON to prevent reverse current in the power converter from output to input.

The power converter may include a pair of input drivers, a pair of back gate drivers, a pair of mid-point drivers, and a pair of grounding drivers.

The power conditioning circuit may provide operating power to the input drivers, back gate drivers, mid-point drivers, and grounding drivers.

The power path controller may receive current and voltage measurements and provide logic signals to the input drivers, back gate drivers, mid-point drivers, and grounding drivers.

Various embodiments also include a method of charging a power adapter having a power converter, including providing input power to the power converter, using the input power to provide operating power to a plurality of driver circuits within the power converter, and controlling a voltage regulation circuit and a charge pump circuit to reduce voltage and increase current to a load of the power adapter.

The method may include switching ON a first input transistor of the voltage regulation circuit and switching ON a first mid-point transistor of the charge pump circuit to charge a first flying capacitor of the charge pump circuit in a first half cycle.

The method may include switching ON a second input transistor of the voltage regulation circuit and switching ON a second mid-point transistor of the charge pump circuit to charge a second flying capacitor of the charge pump circuit in a second half cycle.

The method may include switching OFF a first back gate transistor of the charge pump circuit and switching OFF a first grounding transistor of the charge pump circuit to discharge a first flying capacitor of the charge pump circuit in a first half cycle.

The method may include switching OFF a second back gate transistor of the charge pump circuit and switching OFF a second grounding transistor of the charge pump circuit to discharge a second flying capacitor of the charge pump circuit in a second half cycle.

The method may include switching ON a pair of back gate transistors to prevent reverse current from output to input in the power converter.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
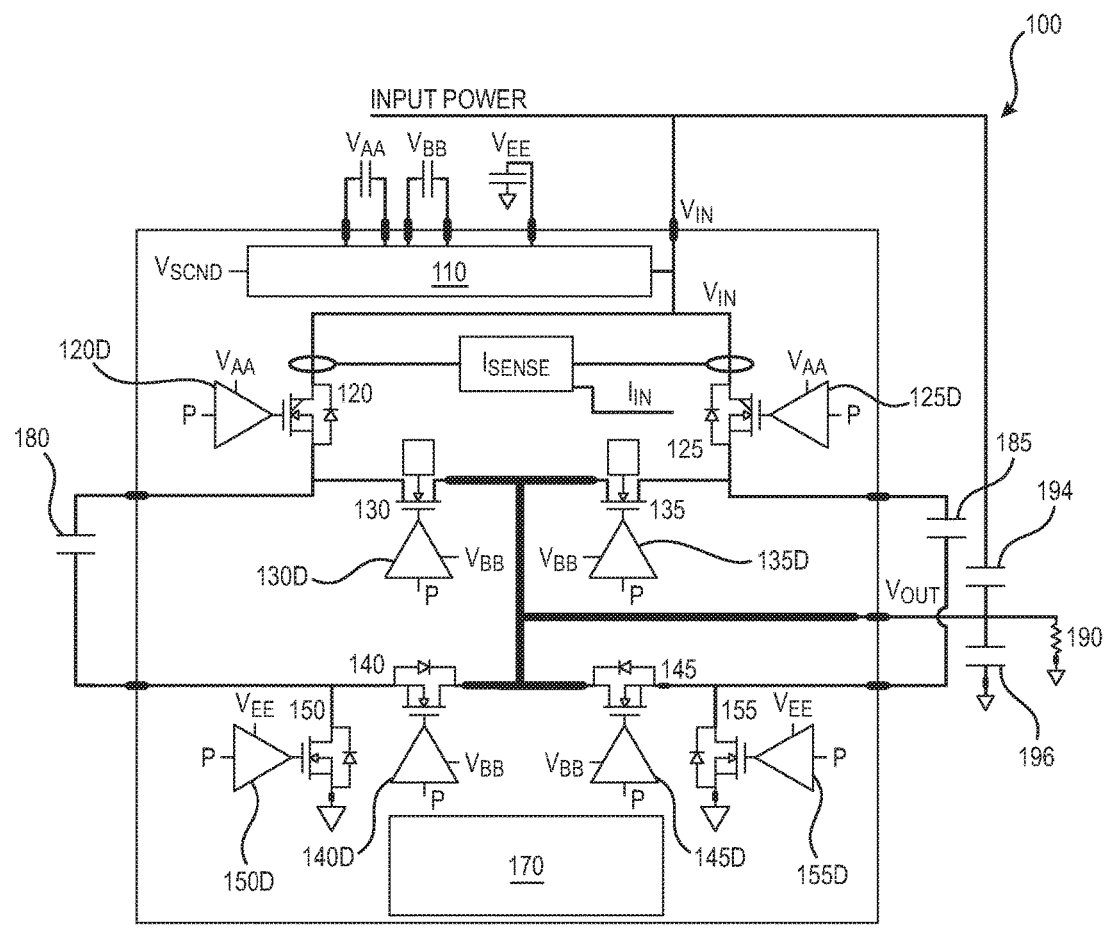
FIG. 1 illustrates an 8-FET circuit topology of a power converter in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Rapid battery charging of smart phones, other mobile devices, and small electronic devices has become increasingly important over the last few years. Charging currents have traditionally been limited to about three amps because of limitations of cables, connectors, and the rate of charge acceptance by Lithium ion (Li-ion) batteries in the mobile devices. Advances in the achievable charge acceptance rates have recently allowed some mobile device batteries to be charged at much higher currents, for example, between six and ten amps for a three amp-hour battery. A commercially available response to this new battery capability was implemented using high-current travel adapters with a special high-current cable and high-current connectors on both ends, providing high-current at a varying voltage with the state-of-charge of the battery.

Embodiments described herein facilitate high-current charging of a Li-ion battery without the complications of a high-current travel adapter and non-standard cables and connectors on the device. Embodiments may be realized using implementation of a 2:1 switched capacitor converter that doubles the input current and halves the input voltage in a very high efficiency converter.

Embodiments described herein include various implementations using a 2:1 switched-capacitor converter that may be used in battery charging of mobile devices and other electronic components.

FIG. 1 illustrates an 8-FET circuit topology of a power converter 100 ("converter") in accordance with embodiments described herein. The converter 100 may include an internal power conditioning circuit 110 to receive input voltage $V_{IN}$ from a power source and provide power signals to driver circuits of the components of the converter 100. Components of the converter 100 may include input transistors 120 and 125, controlled by respective input driver circuits 120D and 125D. The input driver circuits 120D and 125D may receive a power signal $V_{AA}$ from the internal power conditioning circuit 110. Converter 100 may include back gate transistors 130 and 135 controlled by respective back gate driver circuits 130D and 135D. The back gate driver circuits 130D and 135D may receive a power signal $V_{BB}$ from the internal power conditioning circuit 110. Converter 100 may also include mid-point transistors 140 and 145 controlled by respective mid-point driver circuits 140D and 145D, and receive the power signal $V_{BB}$ from the internal power conditioning circuit 110. Converter 100 may include grounding transistors 150 and 155 controlled by respective grounding driver circuits 150D and 155D. The grounding driver circuits 150D and 155D may receive a power signal $V_{EE}$ from the internal power conditioning circuit 110. In addition to $V_{IN}$, the internal power conditioning circuit 110 may have a secondary output $V_{SCND}$ that may be used in some conditions to efficiently pull some chip internal power from $V_{SCND}$ instead of $V_{IN}$. Functionality of the various driver circuits are controlled by a power path controller sensing and logic block 170 ("power path controller 170").

Transistors 120 and 125 may have voltage ratings high enough and be of sufficient size to survive a maximum input voltage that the converter 100 will encounter. Input voltage $V_{IN}$ may be in the range of twice the battery voltage up to about 20V. A battery to be charged may be rated at 5V and operate from 3.5V to 5V. The other six transistors 130, 135, 140, 145, 150, and 155 may be smaller and may use a voltage rating on the order of the maximum output voltage, normally around 5V for Li-ion battery-powered applications. Regulation of the output voltage $V_{OUT}$ is accomplished by controlling the voltage of respective input driver circuits 120D and 125D that correspond to the two input transistors 120 and 125. Current sensing may be implemented to determine the input current $I_{IN}$ by mirroring currents through transistors 120 and 125. Reverse current protection is implemented using back gate switching of the transistors 130 and 135 when the device is not transferring power. Current sensing for the 8-FET topology may be accomplished by various methods. Current mirror circuits for input transistors 120 and 125 can feed into an integrator circuit that produces a voltage proportional to the average current into a chip using the converter 100.

The converter 100 including the 8-FET topology illustrated in FIG. 1 includes a two-phase 2:1 switched-capacitor arrangement, adding output regulation capability and reverse-current protection. With an output regulation capability, the converter 100 may provide an output voltage $V_{OUT}$ that is roughly one-half of the input voltage $V_{IN}$, and the output current $I_{OUT}$ may be twice the input current $I_{SENSE}$. Battery charging applications using the converter 100 are able to control $V_{OUT}$ and $I_{OUT}$ with a high degree of accuracy Voltage regulation may be achieved by the input transistors 120 and 125 in the 8-FET topology. Transistors 120 and 125 may be larger and more robust, able to handle higher voltages. The other transistors 130, 135, 140, 145, 150, and 155 may be rated for the maximum desired output voltage. The transistors described herein may be NMOS or PMOS.

In the converter 100, measured values of $V_{IN}$, $V_{OUT}$, and $I_{SENSE}$ may be input to the power path controller 170 that subsequently provides feedback and control to circuit components within the converter 100. The $V_{IN}$, $V_{OUT}$, and $I_{SENSE}$ signals may be analog inputs that are converted to digital signals by the power path controller 170. Alternatively the power path controller 170 may receive analog inputs and use analog controls to control components of the converter 100. The power path controller 170 may communicate with the internal power conditioning circuit 110 and have connections to the driver circuits to control actions of the converter 100. For example, the power path controller 170 may vary a control signal sent to the input driver circuits 120D or 125D to vary the output voltage of respective input transistors 120 and 125. Power path controller 170 may control back gate driver circuits 130D and 135D that drive back gates 130 and 135 respectively. When the converter 100 is not operating in a power transfer mode, respective back gates 130 or 135 are reversed from a default orientation such that current cannot flow from $V_{OUT}$ to $V_{IN}$, and thus current leakage in the direction from $V_{OUT}$ to $V_{IN}$ may be prevented.

The converter 100 may also include a charge pump circuit 142 having flying capacitors 180 and 185 controlled by a plurality of FETs. The charge pump circuit 142 may include components described above including back gate transistors 130 and 135, back gate drivers 130D and 135D, mid-point transistors 140 and 145, mid-point drivers 140D and 145D, grounding transistors 150 and 155, and grounding drivers 150D and 155D. Flying capacitors 180 and 185 are also known as switching capacitors. Flying capacitors 180 and 185 may float with respect to ground. The power path controller 170 may operate the converter 100 in a dual switched mode, alternating the store of charge in flying capacitors 180 and 185 every half cycle before alternately discharging a capacitance and sending current through the load 190. The action of connecting the load 190 each half cycle to the converter 100 is done with the purpose of doubling the input current at the load 190 while the input voltage may be halved or reduced by other divisor by the input transistors 120 and 125 under the control of the power path converter 170.

An additional way to determine the input current $I_{SENSE}$ is to compute a change in voltage across the flying capacitors 180 or 185 during a portion of a charge cycle when the respective capacitor 180 or 185 is connected between $V_{IN}$ and $V_{OUT}$. This measurement may vary with the effective capacitance of the external flying capacitors, therefore a known current source may be implemented in the chip to function as in-circuit calibration to account for variations in the external components. The converter 100 may further include decoupling capacitors 194 and 196 to smooth out the output signal to the load 190.

In operation, the 8-FET topology of FIG. 1 may function in the following manner. The mid-point transistors 140 and 145 may be switched ON and OFF at the same time as input transistors 120 and 125. Back gate transistors 130 and 135 may likewise be switched ON and OFF in conjunction with grounding transistors 150 and 155.

During a time T1, which may be fifty percent of a full cycle, the power path controller 170 may turn ON transistors 120 and 140, connecting flying capacitor 180 between $V_{IN}$ and $V_{OUT}$. Transistors 130 and 150 are turned OFF. During this same time T1, the power path controller 170 turns ON transistors 135 and 155, connecting flying capacitor 185 between $V_{OUT}$ and ground. Transistors 125 and 145 are turned OFF.

For the second half of the cycle during a time T2, transistors 125 and 145 are switched ON, connecting flying capacitor 185 between $V_{IN}$ and $V_{OUT}$. Transistors 135 and 155 are OFF. During this same time T2, the power path controller 170 turns ON transistors 130 and 150, connecting flying capacitor 180 between $V_{OUT}$ and ground. Transistors 120 and 140 are switched OFF.

During the time T1, the flying capacitor 180 charges to a level of $V_{CHARGE}$, and the flying capacitor 185 discharges to the load 190, after an initial charging half-cycle. During the time T2, the flying capacitor 180 discharges to the load 190, and the flying capacitor 180 charges to the level of $V_{CHARGE}$.

The level of $V_{CHARGE}$ is determined by the power path controller 170. Depending on a desired output charging voltage for the load 190, the power path controller 170 may vary the drive signals to input driver circuits 120D and 125D to vary the level of output $V_{CHARGE}$ that is ultimately sent along $V_{OUT}$ to the load 190.

As discussed herein, back gate transistors 130 and 135 may be used to block leakage current that might normally flow from $V_{OUT}$ to $V_{IN}$. In a normal configuration, when there is power on the battery side at $V_{OUT}$ and zero volts at $V_{IN}$, there is a leakage from $V_{OUT}$ to $V_{IN}$. This is undesired as it would drain the battery. Therefore the back gate transistors 130 and 135 may be NMOS FETs, though not limited thereto, that are configured such that the direction of the body diode inside the transistor may be reversed and block the reverse current.

Figure 2:
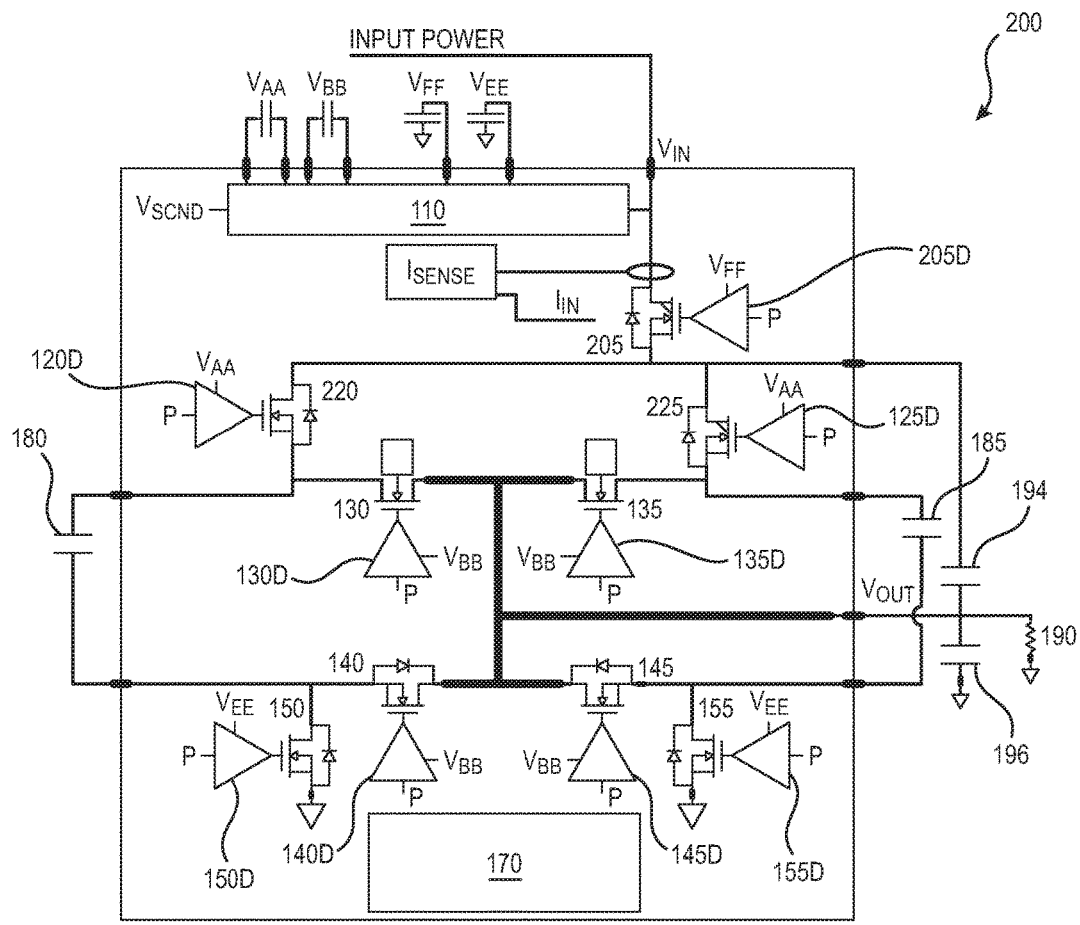
FIG. 2 illustrates a 9-FET circuit topology of a power converter in accordance with embodiments described herein.

FIG. 2 illustrates a 9-FET circuit topology of a power converter 200 in accordance with embodiments described herein. Like numerals and components from FIG. 1 are reused in FIG. 2. In FIG. 2, an implementation of the power converter 200 may include the 9-FET topology, which differs from the 8-FET topology by adding an additional transistor, an input transistor 205, between $V_{IN}$ and the other eight transistors 220, 225, 130, 135, 140, 145, 150, and 155 of the 2:1 switched-capacitor converter 200. Use of the single input transistor 205 removes the switching capability from the initial voltage regulation stage. In this implementation, only the input transistor 205 may be rated and sized for the maximum expected input voltage, and the remainder of the transistors 220, 225, 130, 135, 140, 145, 150, and 155 may be rated and sized smaller for the maximum output voltage of the load 190. Regulation of the output $V_{CHARGE}$ of the input transistor 205 is accomplished by the power path controller 170 controlling a voltage of a gate-driver circuit 215 for the input transistor 205. An additional power source $V_{FF}$ output by the internal power conditioning circuit 110 may be used to power the input gate driver circuit 215. Reverse-current protection in the power converter 200 may be accomplished in a similar manner as for the 8-FET implementation of FIG. 1, or by other techniques described herein.

In the 9-FET topology illustrated in FIG. 2, output voltage regulation is accomplished by feedback and control from the power path controller 170 by sending a control signal having various voltage levels to set the output voltage level $V_{CHARGE}$ used to power the load 190. For example, a low voltage signal from the power path controller 170 will induce a low voltage on the gate of the input transistor 205 resulting in a low $V_{CHARGE}$. A higher voltage signal from the power path controller 170 will induce a higher voltage on the gate of the input transistor 205 resulting in a higher $V_{CHARGE}$. $V_{CHARGE}$ will typically be some quotient of a dividend $V_{IN}$.

According to embodiments described herein, when the converters 100 or 200 are not operating in a power transfer mode, the back gate transistors 130 and 135 are reversed by the power path controller 170 from their default orientation, and current leakage from $V_{OUT}$ to $V_{IN}$ is prevented. Alternatively, for the converter 200 illustrated in FIG. 2, a switching action of a back gate transistor could be implemented on the input transistor 205. Current sensing may be performed in the 9-FET configuration, and can be accomplished by a current mirror at the input transistor 205 that is configured to provide a signal proportional to the current through the input transistor 205 that can be low-pass filtered into a sensing circuit to measure average current.

Both topologies illustrated in FIGS. 1 and 2 use the gate voltage control on the input FETs, the input transistor 205 in the 9-FET implementation and input transistors 120 and 125 in the 8-FET implementation to regulate the output of the converters 100 and 200 and the voltage stresses seen by the other switching transistors. Because the input transistors are controlled to output a voltage $V_{CHARGE}$ generally not greater than twice the desired output voltage, stress caused by higher voltages on the non-input transistors are avoided. Once at a level $V_{CHARGE}$, an output voltage can be further adjusted within a power adapter or similar output mechanism to a desired usage level.

Output impedance may be controlled by controlling the gate voltage of input transistor 205 in the 9-FET implementation or input transistors 120 and 125 in the 8-FET implementation. Embodiments described herein may sense the current through the converters internally. As described herein a small subset of the transistors used may have a higher voltage rating, transistor 205 in the 9-FET implementation or input transistors 120 and 125 in the 8-FET implementation.

The 9-FET implementation of FIG. 2 may operate in a similar manner as the 8-FET implementation of FIG. 1. The switching action of the charge pump circuit and the power path controller 170 operate as described above. Voltage regulation may be performed by the single input transistor 205 and driver circuit 205D.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A power converter, comprising:
   a power conditioning circuit configured to receive input power and set operating voltages of the power converter;
   wherein the input power includes an input current and an input voltage;
   a current sensing circuit to determine the input current of the power converter;
   a voltage regulation circuit configured to step down the input voltage of the input power;
   a charge pump circuit configured to store charge delivered by the voltage regulation circuit and to output to a load a current larger than the input current;
   a power path controller configured to control switching and provide feedback within the power converter; and
   a plurality of back gate transistors to block leakage current from the output current to the input current.

2. The power converter of claim 1, wherein the voltage regulation circuit comprises a single transistor and driver circuit.

3. The power converter of claim 1, wherein the voltage regulation circuit comprises a pair of transistors that are switched at a fifty percent duty cycle.

4. The power converter of claim 1, wherein the charge pump circuit includes a pair of flying capacitors that are alternatively switched to provide power to a load.

5. The power converter of claim 1, wherein the voltage regulation circuit comprises a pair of input transistors and the charge pump circuit includes a pair of back gate transistors, a pair of mid-point transistors, and a pair of grounding transistors.

6. The power converter of claim 5, wherein an input transistor and a mid-point transistor are switched ON to charge the charge pump and are switched OFF to discharge the charge pump.

7. The power converter of claim 5, wherein a back gate transistor and a grounding transistor are switched ON to discharge the charge pump and are switched OFF to charge the charge pump.

8. The power converter of claim 5, wherein the back gate transistors are turned ON to prevent reverse current in the power converter from output to input.

9. The power converter of claim 5, further comprising a pair of input drivers, a pair of back gate drivers, a pair of mid-point drivers, and a pair of grounding drivers.

10. The power converter of claim 9, wherein the power conditioning circuit provides operating power to the input drivers, back gate drivers, mid-point drivers, and grounding drivers.

11. The power converter of claim 9, wherein the power path controller receives current and voltage measurements and provides logic signals to the input drivers, back gate drivers, mid-point drivers, and grounding drivers.

12. A method of charging a power adapter having a power converter, comprising:
   providing input power to the power converter;
   wherein the input power includes an input current and an input voltage;
   using the input power to provide operating power to a plurality of driver circuits within the power converter;
   controlling a voltage regulation circuit and a charge pump circuit to reduce the input voltage and increase an output current to a load of the power adapter; and
   switching a pair of back gate transistors to prevent reverse current from the output current to the input current in the power converter.

13. The method of claim 12, further comprising switching ON a first input transistor of the voltage regulation circuit and switching ON a first mid-point transistor of the charge pump circuit to charge a first flying capacitor of the charge pump circuit in a first half cycle.

14. The method of claim 13, further comprising switching ON a second input transistor of the voltage regulation circuit and switching ON a second mid-point transistor of the charge pump circuit to charge a second flying capacitor of the charge pump circuit in a second half cycle.

15. The method of claim 12, further comprising switching OFF a first back gate transistor of the charge pump circuit and switching OFF a first grounding transistor of the charge pump circuit to discharge a first flying capacitor of the charge pump circuit in a first half cycle.

16. The method of claim 15, further comprising switching OFF a second back gate transistor of the charge pump circuit and switching OFF a second grounding transistor of the charge pump circuit to discharge a second flying capacitor of the charge pump circuit in a second half cycle.

* * * * *